USO11621620B2

(12) United States Patent
Severson et al.

(10) Patent No.: US 11,621,620 B2
(45) Date of Patent: Apr. 4, 2023

(54) ROTOR WINDING WITH A NEUTRAL PLATE FOR A BEARINGLESS INDUCTION MACHINE

(71) Applicant: Wisconsin Alumni Research Foundation, Madison, WI (US)

(72) Inventors: Eric Loren Severson, Middleton, WI (US); Jiahao Chen, Hangzhou Shi (CN)

(73) Assignee: Wisconsin Alumni Research Foundation, Madison, WI (US)

( * ) Notice: Subject to any disclaimer, the term of this patent is extended or adjusted under 35 U.S.C. 154(b) by 214 days.

(21) Appl. No.: 17/117,185

(22) Filed: Dec. 10, 2020

(65) Prior Publication Data

US 2021/0184550 A1    Jun. 17, 2021

Related U.S. Application Data

(60) Provisional application No. 62/947,008, filed on Dec. 12, 2019.

(51) Int. Cl.
   H02K 17/16 (2006.01)
(52) U.S. Cl.
   CPC ....... H02K 17/165 (2013.01); *H02K 2213/03* (2013.01)
(58) Field of Classification Search
   CPC .......... H02K 17/165; H02K 3/12; H02K 3/14; H02K 7/09; H02K 15/09; H02K 15/095; H02K 15/0056; H02K 2213/03; H02K 1/26; H02K 17/02; H02K 17/22; H02K 3/527; H02K 15/0012; H02K 1/28

USPC ............ 310/125, 211, 212, 156.78, 156.79, 310/156.181, 90.5
See application file for complete search history.

(56) References Cited

U.S. PATENT DOCUMENTS

2020/0028409 A1*    1/2020    Jastrzebski ......... F16C 32/0497

FOREIGN PATENT DOCUMENTS

CN    108377045 A  *  8/2018  ............. H02K 1/265

OTHER PUBLICATIONS

Machine Translation of CN 108377045 A (Year: 2018).*
(Continued)

*Primary Examiner* — Ahmed Elnakib
*Assistant Examiner* — Christopher S Leone
(74) *Attorney, Agent, or Firm* — Bell & Manning, LLC

(57) ABSTRACT

A rotor for a bearingless induction motor is provided. A rotor core defines rotor slots. A rotor winding includes a common connector plate, a plurality of rotor connector plates, and a slot conductor mounted within each rotor slot. The common connector plate is mounted adjacent a first end of the rotor core. The plurality of rotor connector plates is mounted adjacent a second end of the rotor core. Each slot conductor is electrically connected to the common connector plate and to one rotor connector plate of the plurality of rotor connector plates. Each rotor connector plate of the plurality of rotor connector plates is configured to connect a group of slot conductors that includes at least two slot conductors. A number of slot conductors included in the group of slot conductors is defined based on a predefined number of suspension pole pairs selected to provide a radial suspension force.

20 Claims, 9 Drawing Sheets

(56) References Cited

OTHER PUBLICATIONS

Ye et al., "Modeling and performance analysis on a bearingless fixed-pole rotor induction motor," IET Electric Power Applications, 2019, vol. 13 Iss. 2, pp. 259-266, 2018.

Chen et al., "Optimal Design of the Bearingless Induction Motor for Industrial Applications," 2019 IEEE Energy Conversion Congress and Exposition (ECCE), Baltimore, MD, USA, 2019, pp. 5265-5272, doi: 10.1109/ECCE.2019.8912543.

Chen et al., "Design and Modeling of the Bearingless Induction Motor," *019 IEEE International Electric Machines & Drives Conference (IEMDC)*, San Diego, CA, USA, 2019, pp. 343-350, doi: 10.1109/EMOC.2019.8785270.

Wang et al., "Comparison of Nested-Loop Rotors in Brushless Doubly-Fed Induction Machines," 2016 19th International Conference on Electrical Machines and Systems (ICEMS), Chiba, 2016, pp. 1-6.

Chiba et al., "Influence of Rotor Skew in Induction Type Bearingless Motor," IEEE Transactions on Magnetics, vol. 48, No. 11, Nov. 2012, pp. 4646-4649.

Pyrhonen, Juha, Tapani Jokinen, and Valeria Hrabovcova. Design of rotating electrical machines. Chapter 7.2, John Wiley & Sons, 2013.

\* cited by examiner

ROTOR WINDING WITH A NEUTRAL PLATE FOR A BEARINGLESS INDUCTION MACHINE

CROSS REFERENCE TO RELATED APPLICATION

The present application claims priority to U.S. provisional application No. 62/947,008, that was filed Dec. 12, 2019, the entire contents of which are incorporated herein by reference.

BACKGROUND

Mechanical bearings used to support the shaft of high-speed motor systems severely limit the system lifetime, can be a source of significant losses, and require lubricants that can interfere with the broader system. Bearingless motors provide the functionality of a magnetic bearing and a motor in a single electric machine. Compared to systems that utilize a motor with separate magnetic bearings, bearingless technology results in a more integrated system which requires less raw material and can be designed for higher speeds due to shorter shaft lengths. Applications range from low speed, hygienic mixing devices, pumps, and artificial hearts to high and ultra-high-speed machines for flywheels, spindle tools, and turbomachinery, etc.

Induction motors are regarded as the "workhorse" of industry due to their robust structure, suitability for harsh environments, low cost components, and extreme reliability. However, induction motors have seen only limited consideration as a bearingless motor due to the complex design factors involved.

SUMMARY

In an example embodiment, a rotor is provided that includes, but is not limited to, a rotor core and a rotor winding. The rotor core defines a plurality of rotor slots. The rotor winding includes, but is not limited to, a common connector plate, a plurality of rotor connector plates, and a slot conductor mounted within each rotor slot. The common connector plate is mounted adjacent a first end of the rotor core. The plurality of rotor connector plates are mounted adjacent a second end of the rotor core where the first end is opposite the second end. Each slot conductor is electrically connected to the common connector plate and to one rotor connector plate of the plurality of rotor connector plates. Each rotor connector plate of the plurality of rotor connector plates is configured to connect a group of slot conductors that includes at least two slot conductors. A number of slot conductors included in the group of slot conductors is defined based on a predefined number of suspension pole pairs selected to provide a radial suspension force.

In another example embodiment, a rotor is provided that includes, but is not limited to, a rotor core and a rotor winding. The rotor core defines a plurality of rotor slots. The rotor winding includes, but is not limited to, a common connector plate, a first plurality of rotor connector plates, a second plurality of rotor connector plates, a third plurality of rotor connector plates, a first plurality of slot conductors, a second plurality of slot conductors, and a third plurality of slot conductors. The common connector plate is mounted adjacent a first end of the rotor core. The first plurality of rotor connector plates are mounted adjacent a second end of the rotor core, wherein the first end is opposite the second end. The second plurality of rotor connector plates are mounted adjacent the second end of the rotor core. The third plurality of rotor connector plates are mounted adjacent the first end of the rotor core. The first plurality of slot conductors are mounted within first rotor slots of the plurality of rotor slots. Each slot conductor of the first plurality of slot conductors is electrically connected to the common connector plate and to one rotor connector plate of the first plurality of rotor connector plates. The second plurality of slot conductors are mounted within second rotor slots of the plurality of rotor slots. Each slot conductor of the second plurality of slot conductors is electrically connected to the common connector plate and to one rotor connector plate of the second plurality of rotor connector plates. The third plurality of slot conductors are mounted within third rotor slots of the plurality of rotor slots. Each slot conductor of the third plurality of slot conductors is electrically connected to one rotor connector plate of the third plurality of rotor connector plates and to either the one rotor connector plate of the first plurality of rotor connector plates or the one rotor connector plate of the second plurality of rotor connector plates. Each rotor connector plate of the third plurality of rotor connector plates is configured to connect a pair of slot conductors of the third plurality of slot conductors.

Other principal features of the disclosed subject matter will become apparent to those skilled in the art upon review of the drawings described below, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
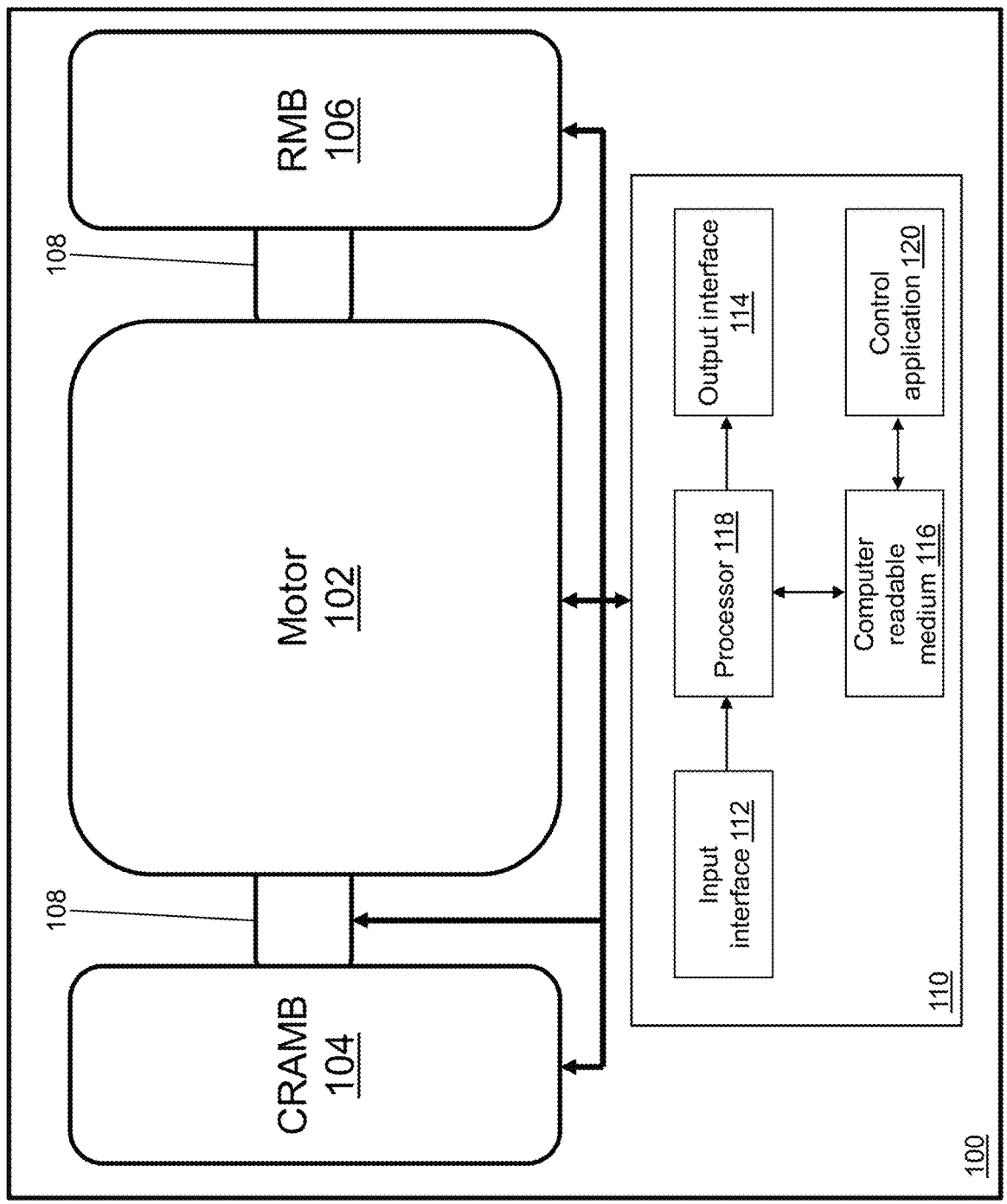
FIG. 1 depicts a motor system in accordance with an illustrative embodiment.

Referring to FIG. 1, a block diagram of an electrical machine system 100 is shown in accordance with an illustrative embodiment. Electrical machine system 100 may include a motor 102, a combined radial and axial magnetic bearing (CRAMB) 104, a radial magnetic bearing (RMB) 106, a shaft 108, and an electrical machine controller 110. Shaft 108 is common to motor 102, CRAMB 104, and RMB 106.

Motor 102 can be implemented as any type of an induction machine. Motor 102 further may be a bearingless motor eliminating a need for RMB 106. A bearingless motor provides the functionality of a magnetic bearing and a motor in a single electric machine. Compared to systems that utilize a motor with separate magnetic bearings, bearingless technology results in a more integrated system that requires less raw material and can be designed for higher speeds due to shorter shaft lengths. Applications for a bearingless motor range from low speed, hygienic mixing devices, pumps, and artificial hearts to high and ultra-high speed machines for flywheels, spindle tools, and turbomachinery, etc.

Electrical machine controller 110 may include an input interface 112, an output interface 114, a non-transitory computer-readable medium 116, a processor 118, and a control application 120. Fewer, different, and/or additional components may be incorporated into electrical machine controller 110.

Input interface 112 provides an interface for receiving information from the user or another device for entry into electrical machine controller 110 as understood by those skilled in the art. Input interface 112 may interface with various input technologies including, but not limited to, a keyboard, a microphone, a mouse, a display, a track ball, a keypad, one or more buttons, etc. to allow the user to enter information into electrical machine controller 110 or to make selections presented in a user interface displayed on the display. Input interface 112 may further receive signals such as sensor signals from any of motor 102, CRAMB 104, and RMB 106.

The same interface may support both input interface 112 and output interface 114. For example, a touch screen provides a mechanism for user input and for presentation of output to the user. Electrical machine controller 110 may have one or more input interfaces that use the same or a different input interface technology. The input interface technology further may be accessible by electrical machine controller 110 through a communication interface (not shown).

Output interface 114 provides an interface for outputting information for review by a user of electrical machine controller 110 and/or for use by another application or device. For example, output interface 114 may interface with various output technologies including, but not limited to, the display, a speaker, a printer, etc. Electrical machine controller 110 may have one or more output interfaces that use the same or a different output interface technology. Output interface 114 may further output control signals in the form of currents or voltages to any of motor 102, CRAMB 104, and RMB 106. Output interface 114 further may be accessible by electrical machine controller 110 through the communication interface.

Computer-readable medium 116 is an electronic holding place or storage for information so the information can be accessed by processor 118 as understood by those skilled in the art. Computer-readable medium 116 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Electrical machine controller 110 may have one or more computer-readable media that use the same or a different memory media technology. For example, computer-readable medium 116 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Electrical machine controller 110 also may have one or more drives that support the loading of a memory media such as a CD, DVD, an external hard drive, etc. One or more computer-readable media may be connected to electrical machine controller 110 using the communication interface.

Processor 118 executes instructions as understood by those skilled in the art. The instructions may be carried out by a special purpose computer, logic circuits, or hardware circuits. Processor 118 may be implemented in hardware and/or firmware. Processor 118 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 118 operably couples with input interface 112, with output interface 114, and with computer-readable medium 116 to receive, to send, and to process information. Processor 118 may retrieve a set of instructions from a permanent memory device and copy the instructions in an executable form to a temporary memory device that is generally some form of RAM. Electrical machine controller 110 may include a plurality of processors that use the same or a different processing technology.

Some processors may be central processing units (CPUs). Some processes may be more efficiently and speedily executed and processed with machine specific processors. For example, some of these processors can include an application-specific integrated circuit, a field-programmable gate array, a purpose-built chip architecture, etc. using semiconductor devices.

Control application 120 performs operations associated with controlling operation of motor 102, CRAMB 104, and/or RMB 106. Illustrative operations may include those described in U.S. patent application Ser. No. 16/387,959 filed Apr. 18, 2019. Operation of motor 102 may control shaft 108 to rotate. In an alternative embodiment, motor 102 may be configured to operate as a generator that generates electrical energy when shaft 108 is rotated. The operations of control application 120 control the generation of torque when motor 102 is configured to rotate shaft 108 as well as magnetic suspension forces on shaft 108 to provide the bearingless operation of motor 102. In an alternative embodiment, the operations of control application 120 control the generation of the electrical energy when motor 102 is operated as a generator as well as the magnetic suspension forces on shaft 108 to provide the bearingless operation of motor 102.

Figure 2:
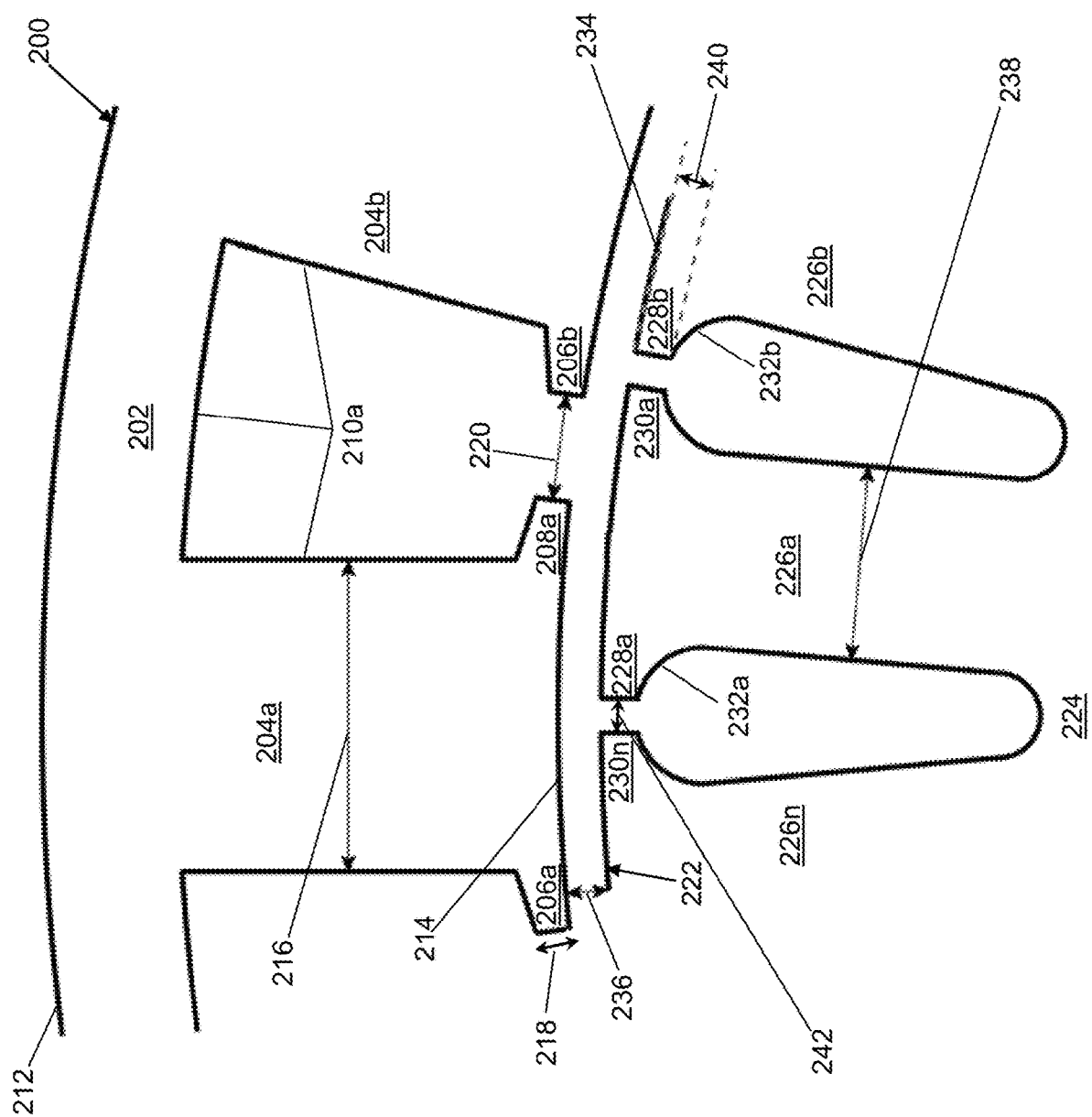
FIG. 2 depicts a cross sectional view of a portion of a motor of the motor system of FIG. 1 in accordance with an illustrative embodiment.

Referring to FIG. 2, a portion of motor 102 is shown in accordance with an illustrative embodiment. Motor 102 may include a stator 200 and a rotor 222 separated by an air gap having an air gap width 236. Only a portion of stator 200 and of rotor 222 are shown for simplicity and to show various structural characteristics related to designing motor 102. Stator 200 includes a cylindrical stator core that defines a plurality of stator teeth that define a plurality of stator slots within which a stator winding is wound. The stator winding may be a no voltage combined winding that produces both a torque and a suspension force when motor 102 is operated as a motor. In an alternative embodiment, stator 200 may include separate torque and suspension force windings as understood by a person of skill in the art.

The portion of stator 200 shown in FIG. 2 includes a stator core base 202 (only a portion of which is shown), a first stator tooth 204a, a first left stator tooth head 206a, a first right stator tooth head 208a, a second stator tooth 204b (only a portion of which is shown), and a second left stator tooth head 206b. Stator 200 may include $Q_s$ number of stator slots. For example, a wall of first stator tooth 204a, of second stator tooth 204b, and of stator core base 202 define walls for a first stator slot wall 210a. A shape of each slot may vary from that shown in the illustrative embodiment.

In the illustrative embodiment, the plurality of stator teeth extend inward from stator core base 202 towards rotor 222. Stator core base 202 includes an outer stator surface 212 that defines a stator radius measured relative to a radial center of stator 200 that is also a radial center of rotor 222 and of shaft 108. A shape of each tooth may vary from that shown in the illustrative embodiment. First stator tooth 204a includes an inner stator surface 214 that is closest to the air gap between stator 200 and rotor 222. Design parameters for stator 200 include a stator tooth width 216, for example, across first stator tooth 204a, a stator tooth head height 218, for example, of first left stator tooth head 206a in a radial direction, and a stator head slot width 220 which is a distance, for example, between first right stator tooth head 208a and second left stator tooth head 206b.

As understood by a person of skill in the art, stator 200 may be formed of a plurality of laminations stacked closely together in an axial direction that is perpendicular to the radial plane shown in FIG. 2. Stator 200 may be formed of an electrically conductive materials such as iron, cobalt, nickel, etc.

Rotor 222 includes a cylindrical rotor core that defines a plurality of rotor teeth that define a plurality of rotor slots within which a rotor winding is mounted. The portion of stator 200 shown in FIG. 2 includes a rotor core base 224 (only a portion of which is shown), a first rotor tooth 226a, a first left rotor tooth head 228a, a first right rotor tooth head 230a, a second rotor tooth 226b (only a portion of which is shown), a second left rotor tooth head 228b, an nth rotor tooth 226n (only a portion of which is shown), and an nth right rotor tooth head 230n. Rotor 222 may include $Q_r$ number of rotor slots. For example, a wall of first rotor tooth 226a, of nth rotor tooth 226n, and of rotor core base 224 define walls for a first rotor slot wall 232a. Similarly, a wall of first rotor tooth 226a, second nth rotor tooth 226b, and of rotor core base 224 define walls for a second rotor slot wall 232b. the plurality of rotor slots are evenly distributed circumferentially around the rotor core adjacent an outer edge of the rotor core. A shape of each slot may vary from that shown in the illustrative embodiment.

In the illustrative embodiment, the plurality of rotor teeth extend outward from rotor core base 224 towards stator 200. Rotor core base 224 includes an outer rotor surface 234 that defines a rotor radius measured relative to the radial center of rotor 222. A shape of each tooth may vary from that shown in the illustrative embodiment. First rotor tooth 226a includes outer rotor surface 234 that is closest to the air gap between stator 200 and rotor 222. Design parameters for rotor 222 include a rotor tooth width 238, for example, across first rotor tooth 226a, a rotor tooth head height 240, for example, of second left rotor tooth head 228b in a radial direction, and a rotor head slot width 242 which is a distance, for example, between nth right rotor tooth head 230n and first left rotor tooth head 228a.

As understood by a person of skill in the art, rotor 222 may be formed of a plurality of laminations stacked closely together in an axial direction that is perpendicular to the radial plane shown in FIG. 2. Rotor 222 may be formed of an electrically conductive materials such as steel, iron, cobalt, nickel, etc.

When motor 102 is operated as a motor, the stator winding is connected to an alternating current power source to produce a rotating magnetic field. Current is induced in the rotor winding by the stator field. The current induced in rotor 222 rotates at the stator field rotation rate minus the physical rotation rate of rotor 222. The interaction of the magnetic fields of currents in stator 200 and rotor 222 produce a torque on rotor 222 that in turn rotates shaft 108 to which rotor 222 is mounted. Conversely, motor 102 may be operated as a generator by rotating shaft 108 faster than a synchronous speed of stator 200 thereby causing motor 102 to generate power.

For example, when motor 102 is operated as a motor, motor 102 generates a first magnetic field to produce the torque. The torque field is ideally sinusoidal with p torque pole pairs, that is $B_m(\alpha)=\hat{B}_m \cos(p\alpha-\phi_m)$. When motor 102 is operated as a bearingless motor, motor 102 also generates a second magnetic field in the air gap that is used to produce the suspension forces. The suspension field is ideally sinusoidal with $p_s$ suspension pole pairs, that is: $B_s(\alpha)=\hat{B}_s \cos(p_s\alpha-\phi_s)$. To produce a radial force, $p_s=p\pm 1$. High performance bearingless induction motors include a rotor winding that experiences magnetic induction due to the torque field, but does not experience induction due to the suspension field. This can be stated as the winding factor of the rotor winding is zero at the suspension field harmonic ($p_s$), that is: $k_{w,p_s}=0$, while the winding factor of the rotor winding cannot be zero at the motor's field harmonic (p), that is $k_{w,p}\neq 0$. Motor 102 includes a rotor winding with a plurality of phases such that $k_{w,p_s}=0$ and $k_{w,p}\neq 0$ by electrically connecting coil groups to a common conductor to reduce a number of coil end connections. Induction from the suspension field may be eliminated through selection of a coil span to ensure that each rotor coil does not link to the suspension field. A coil is composed of two or more coil sides with each side residing in a separate slot of rotor 222 and two or more end connections at the axial ends of rotor 222. A coil group is a group of at least one coil where the coils are connected in series.

Figure 3:
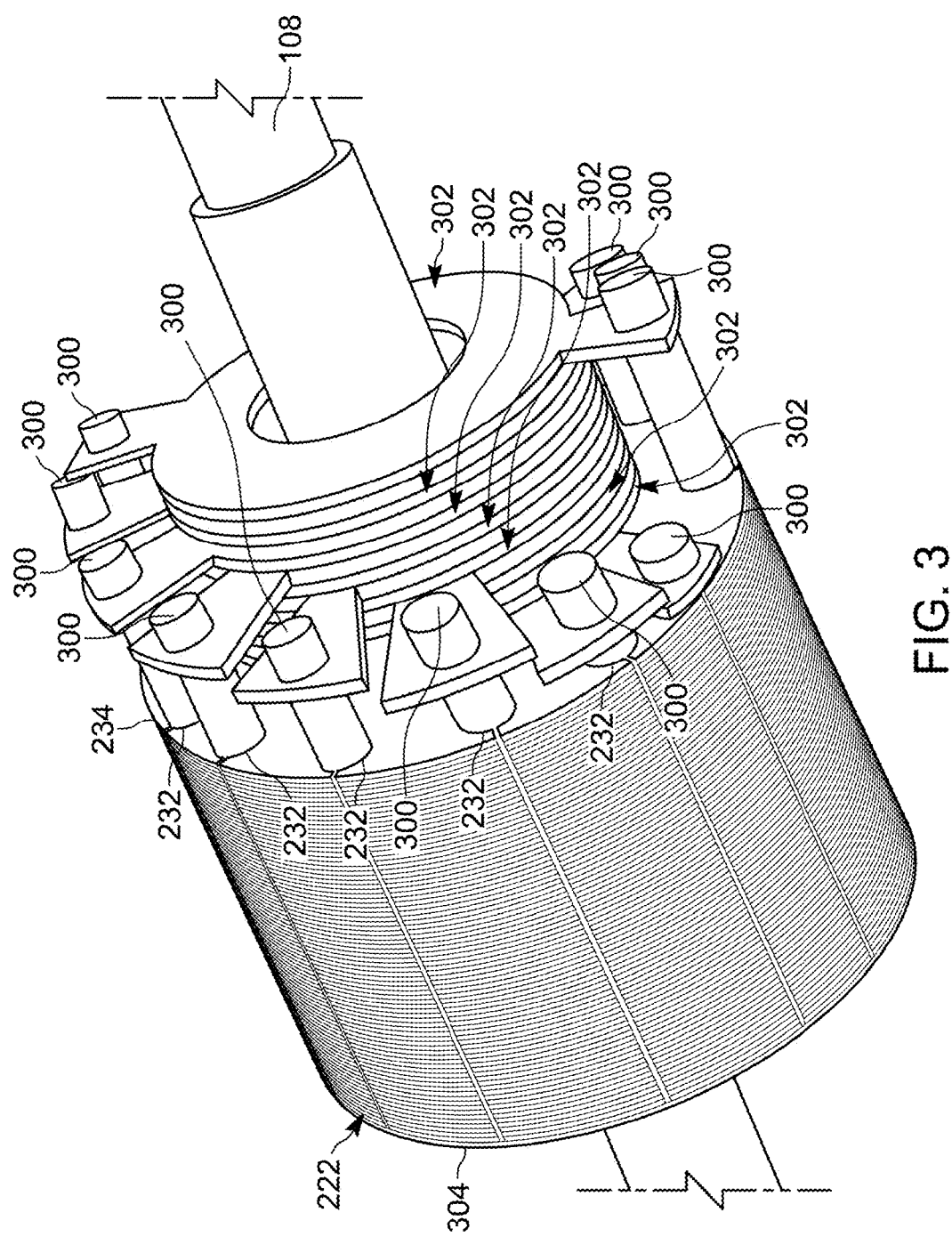
FIG. 3 depicts a side perspective view of a rotor of the motor of FIG. 2 in accordance with an illustrative embodiment.

Referring to FIG. 3, a side perspective view of rotor 222 is shown in accordance with an illustrative embodiment. In the illustrative embodiment of FIG. 3, rotor 222 includes $Q_r=16$ rotor slots. Rotor 222 further includes a plurality of rotor slot conductors 300, where each slot holds a rotor slot conductor of the plurality of rotor slot conductors 300. Each rotor slot conductor forms one side of a coil. Each rotor slot of the plurality of rotor slots 232 extends parallel to a longitudinal axis defined axially through the center of the rotor core. Each rotor slot conductor of the plurality of rotor slot conductors 300 may be formed of a single copper or aluminum bar of a type similar to those used in conventional squirrel cage induction motors. Alternatively, each rotor slot conductor of the plurality of rotor slot conductors 300 may instead be formed using random wound coils of magnetic wire, additively manufactured copper structures, printed circuit board traces, etc.

Rotor 222 further includes a plurality of rotor connector plates 302 and a common connector plate 304. Each rotor connector plate of the plurality of rotor connector plates 302 may be formed using additively manufactured copper structures, printed circuit board traces, etc. On one axial end (a first end) of rotor 222, all coil sides are electrically connected to each other by common connector plate 304 that may be a copper neutral plate. At the other axial end (a second end) of rotor 222, each rotor connector plate of the plurality of rotor connector plates 302 connects between a unique pair of slot conductors separated by 180 degrees in the illustrative embodiment.

The rotor winding is composed of one or more phases and one or more base windings. Base windings are an independent section of a winding and can be connected in parallel or series to provide a complete winding. All base windings experience the same magnetic conditions and are electrically equivalent. The rotor winding is designed so that each base winding consists of one coil per phase. The phase winding terminals are shorted together and to the winding's neutral, so that the electromotive force induced by the motor's rotating magnetic field results in a current flowing in the rotor winding. This short circuit is equivalent to placing a short across each phase winding. Since each phase consists of a set of parallel connected base windings, this short circuit can be equivalently and advantageously implemented by electrically connecting the same end of all of the plurality of rotor slot conductors 300. By sharing this connection (using a common neutral point), the rotor winding has fewer end-connections for the plurality of rotor slot conductors 300, which significantly reduces an axial length of motor 102.

Figure 4:
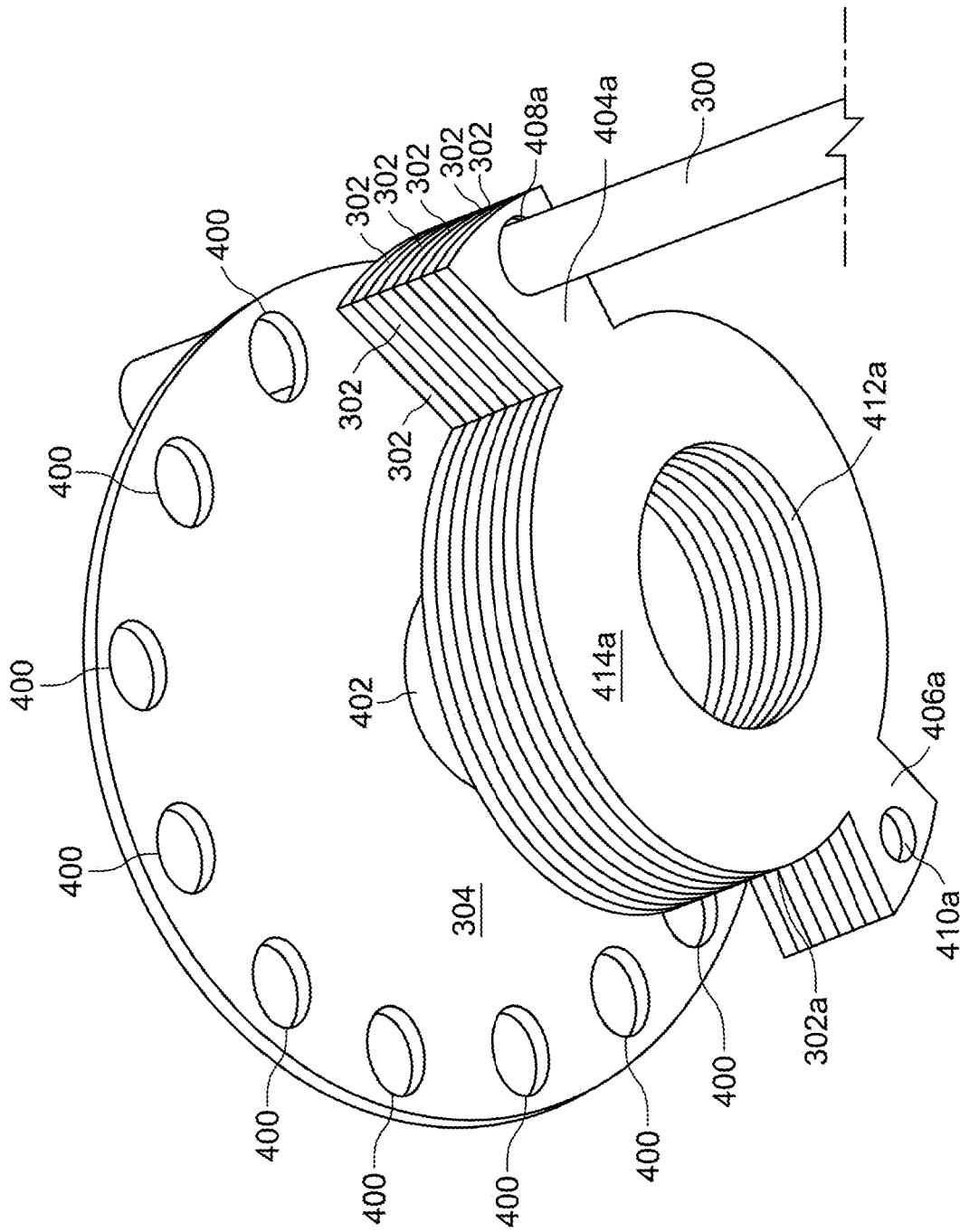
FIG. 4 depicts a perspective view of a common connector plate and a plurality of rotor connector plates of the rotor of FIG. 3 in accordance with an illustrative embodiment.

Referring to FIG. 4, a perspective view of common connector plate 304 and the plurality of rotor connector plates 302 is shown in accordance with an illustrative embodiment. Common connector plate 304 includes common connector conductor aperture walls 400 and a common connector shaft aperture wall 402. Common connector plate 304 comprises a plate of electrically conductive material through which conductor apertures are formed as defined by the common connector conductor aperture walls 400. Each rotor slot conductor of the plurality of rotor slot conductors 300 is inserted in a single aperture of the common connector conductor aperture walls 400. Common connector conductor aperture walls 400 are evenly distributed circumferentially around common connector plate 304 adjacent an outer edge of common connector plate 304. Common connector shaft aperture wall 402 defines an aperture formed through a center of common connector plate 304 through which shaft 108 is inserted when rotor 222 is mounted to shaft 108 for rotation.

In the illustrative embodiment of FIGS. 3 and 4, a number of the plurality of rotor connector plates 302 is $Q_r/2$ because a unique pair of rotor slot conductors of the plurality of rotor slot conductors 300 is mounted to each rotor connector plate of the plurality of rotor connector plates 302. For example, in the illustrative embodiment of FIG. 3, the number of the plurality of rotor connector plates 302 is $$\frac{16}{2} = 8.$$

Each rotor connector plate of the plurality of rotor connector plates 302 may be identical though rotated around rotor 222 to successively mount between different pairs of rotor slot conductors. As shown in FIG. 3, the plurality of rotor connector plates 302 are distributed in an axial direction parallel to a longitudinal axis defined axially through a center of the rotor core such that the plurality of rotor connector plates 302 do not touch each other or the rotor core. For example, an insulating material may be formed between each pair of the plurality of rotor connector plates 302 and/or between rotor 222 and a rotor connector plate closest to rotor 222 to electrically isolate them from each other.

For illustration, a first rotor connector plate 302a is an illustrative rotor connector plate of the plurality of rotor connector plates 302. First rotor connector plate 302a comprises a plate of electrically conductive material. First rotor connector plate 302a may include a first base 414a, a first right protrusion 404a, and a first left protrusion 406a. First right protrusion 404a and first left protrusion 406a extend outward from first base 414a on opposite sides such that a radial center of first right protrusion 404a and of first left protrusion 406a are separated by 180°.

A first right protrusion aperture wall 408a is formed through first right protrusion 404a. A first left protrusion aperture wall 410a is formed through first left protrusion 406a. Each rotor slot conductor of the plurality of rotor slot conductors 300 is inserted in a single aperture of the plurality of rotor connector plates 302. Because first right protrusion 404a and first left protrusion 406a are separated by 180°, the pair of slot conductors connected to each rotor connector plate of the plurality of rotor connector plates 302 are also rotated by 180° around the rotor core relative to each other. In an illustrative embodiment, the plurality of rotor slot conductors 300 may be welded to common connector plate 304 and to a respective rotor connector plate of the plurality of rotor connector plates 302.

A first connector shaft aperture wall 412a is formed through a center of first base 414a. A first connector shaft aperture wall 412a defines an aperture through which shaft 108 is inserted when rotor 222 is mounted to shaft 108 for rotation.

Figure 5:
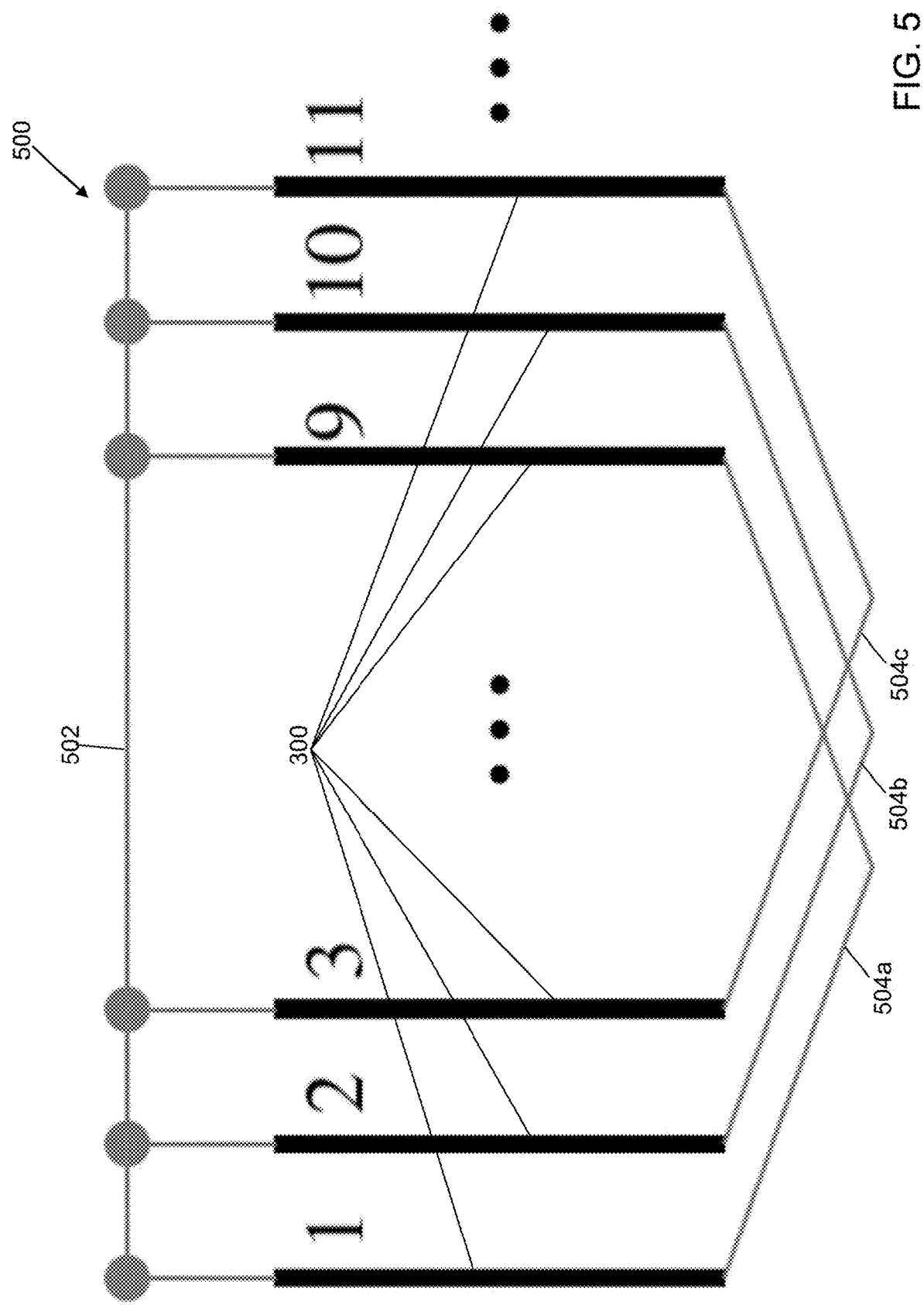
FIG. 5 depicts a first rotor winding of the rotor of FIG. 3 in accordance with an illustrative embodiment.

Referring to FIG. 5, a rotor winding 500 of rotor 222 is shown in accordance with an illustrative embodiment with $Q_r=16$, $N_p=8$, $p=1$, and $p_s=2$, where $N_p$ is a number of electrical phases. Rotor winding 500 may include a first common connection 502, the plurality of rotor slot conductors 300, a first connection pair 504a, a second connection pair 504b, a third connection pair 504c, a fourth connection pair (not shown), a fifth connection pair (not shown), a sixth connection pair (not shown), a seventh connection pair (not shown), and an eighth connection pair (not shown). For illustration, first common connection 502 may be created by connecting a first end of the plurality of rotor slot conductors 300 to common connector plate 304. For illustration, first connection pair 504a, second connection pair 504b, third connection pair 504c, the fourth connection pair, the fifth connection pair, the sixth connection pair, the seventh connection pair, and the eighth connection pair may be created by connecting a second end of the plurality of rotor slot conductors 300 to the respective rotor connector plate of the plurality of rotor connector plates 302 as shown in FIG. 3.

Figure 6:
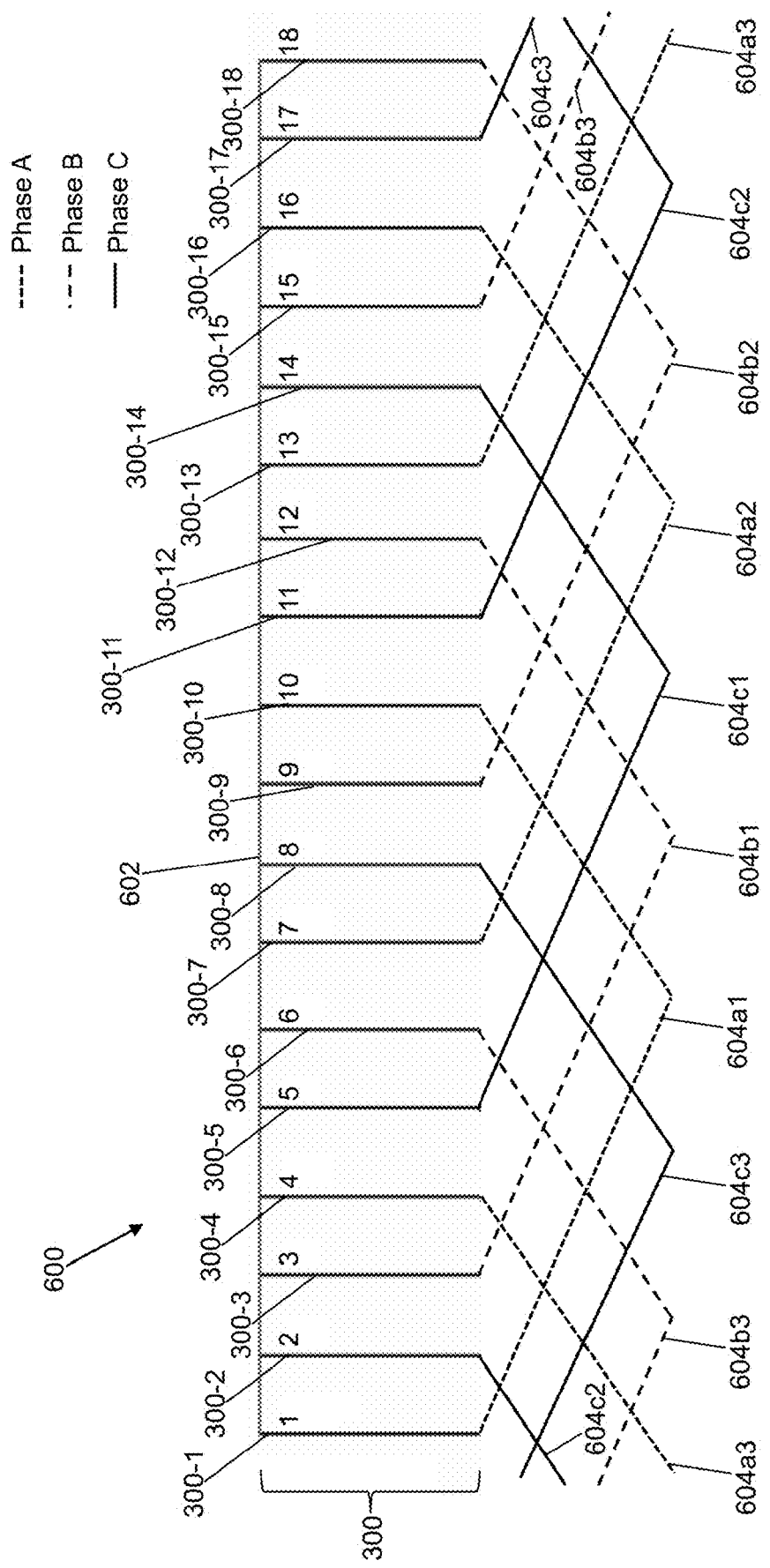
FIG. 6 depicts a second rotor winding in accordance with an illustrative embodiment.

Referring to FIG. 6, a second rotor winding 600 is shown in accordance with an illustrative embodiment with $Q_r=18$, $N_p=3$, $p=3$, and $p_s=2$. Second rotor winding 600 may include a second common connection 602, the plurality of rotor slot conductors 300, a phase A, first connection pair 604a1, a phase A, second connection pair 604a2, a phase A, third connection pair 604a3, a phase B, first connection pair 604b1, a phase B, second connection pair 604b2, a phase B, third connection pair 604b3, a phase C, first connection pair 604c1, a phase C, second connection pair 604c2, and a phase C, third connection pair 604c3.

The plurality of rotor slot conductors 300 include a first rotor slot conductor 300-1, a second rotor slot conductor 300-2, a third rotor slot conductor 300-3, a fourth rotor slot conductor 300-4, a fifth rotor slot conductor 300-5, a sixth rotor slot conductor 300-6, a seventh rotor slot conductor 300-7, an eighth rotor slot conductor 300-8, a ninth rotor slot conductor 300-9, a tenth rotor slot conductor 300-10, an eleventh rotor slot conductor 300-11, a twelfth rotor slot conductor 300-12, a thirteenth rotor slot conductor 300-13, a fourteenth rotor slot conductor 300-14, a fifteenth rotor slot conductor 300-15, a sixteenth rotor slot conductor 300-16, a seventeenth rotor slot conductor 300-17, and an eighteenth rotor slot conductor 300-18.

For illustration, second common connection 602 may be created by connecting a first end of the plurality of rotor slot conductors 300 to common connector plate 304 with 18 apertures instead of 16. For illustration, phase A, first connection pair 604a1, phase A, second connection pair 604a2, phase A, third connection pair 604a3, phase B, first connection pair 604b1, phase B, second connection pair 604b2, phase B, third connection pair 604b3, phase C, first connection pair 604c1, phase C, second connection pair 604c2, and phase C, third connection pair 604c3 may be created by connecting the second end of the plurality of rotor slot conductors 300 to a respective rotor connector plate of the plurality of rotor connector plates 302 as shown in FIG. 3 though there are now nine rotor connector plates stacked axially relative to the second end. Again, the pairs of rotor slot conductors are separated by 180°.

Second rotor winding 600 includes one slot per pole per phase. Second rotor winding 600 consists of three base windings connected in parallel. Each base winding has one coil per phase. For example, a first base winding includes first rotor slot conductor 300-1, phase A, first connection pair 604a1, tenth rotor slot conductor 300-10, third rotor slot conductor 300-3, phase B, first connection pair 604b1, twelfth rotor slot conductor 300-12, fifth rotor slot conductor 300-5, phase C, first connection pair 604c1, fourteenth rotor slot conductor 300-14, and second common connection 602.

Using second rotor winding 600, the torque field from motor 102 induces an electromotive force in all of the plurality of rotor slot conductors 300, but the suspension field does not induce an electromotive force in any of the plurality of rotor slot conductors 300. This is accomplished by making each coil span 180° in the illustrative embodiment of FIG. 6.

In alternative embodiments, motor 102 may include a rotor winding with different combinations of the number of torque pole pairs p, the number of rotor slots $Q_r$, and the number of suspension pole pairs $p_s$ to define a number of slot conductors $Q'_r$ connected to each rotor connector plate of the plurality of rotor connector plates 302, and a number of the plurality of rotor connector plates 302 $N_{rcp}$. The slot conductors connected to a common rotor connector plate may be referred to as a conductor set that is designed so that current is induced in the conductor set by the airgap field used for operation of motor 102 in generating torque (a field having p pole-pairs), but no current is induced in the conductor set by the airgap field used for levitation or suspension (a field having $p_s$ pole pairs). To prevent a conductor set from linking the suspension field, $Q'_r$ conductors in a conductor set are equally spaced in a circumferential direction by an angle $\alpha=2\pi/Q'_r$ so that $$p_s \frac{\alpha}{2} = k\pi, k \in N.$$

This can be solved to determine that the number of slot conductors $Q'_r$ in the conductor set can be any integer greater than one in the set $Q'_r=p_s/k$. In other words, $Q'_r$ can be any factor of $p_s$ greater than one. To illustrate this, illustrative examples for values of $Q'_r$ based on a predefined $p_s$ value include:

$p_r=2$: each cage conductor set has $Q_r'=2$ conductors.
$p_r=3$: each cage conductor set has $Q_r'=3$ conductors.
$p_r=4$: each cage conductor set has $Q_r'=2$ or $Q_r'=4$ conductors.
$p_r=5$: each cage conductor set has $Q_r'=5$ conductors.

Typically, a motor designer selects $p_s<6$ to achieve acceptable motor performance though this is not required and may vary based on the design goals of a particular motor.

Rotor 222 includes multiple equivalent cage conductor sets that are rotated from each other so that there is an equal angular spacing between all conductors. The motor designer may select a desired combination of p, $p_s$, and $Q_r$, where $Q_r$ is a total number of conductors summed over all conductor sets, and $N_{rcp}=Q_r/Q'_r$. It is typically most advantageous to select a largest $Q'_r$ value possible to minimize a number of cage conductor sets and, as a result, $N_{rcp}$ that is the number of the plurality of rotor connector plates 302. Minimizing $N_{rcp}$ reduces an axial length of rotor 222 that includes the plurality of rotor connector plates 302, which improves rotor dynamics, among other advantages, and makes a machine lower cost to fabricate.

Figure 7A:
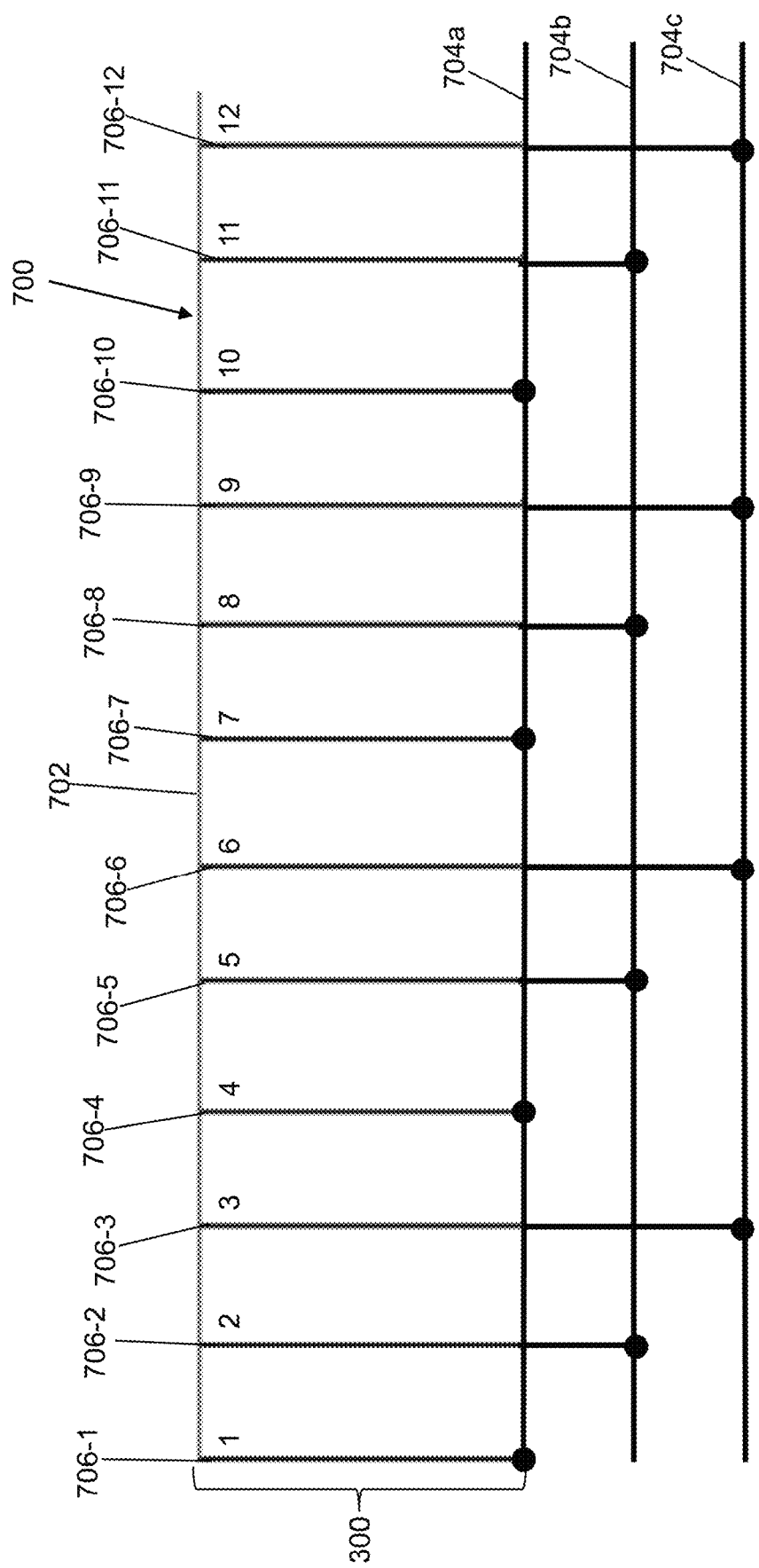
FIG. 7A depicts a third rotor winding in accordance with an illustrative embodiment.

For illustration, referring to FIG. 7A, a third rotor winding 700 is shown in accordance with an illustrative embodiment. Third rotor winding 700 is applied to a motor with p=3, $p_s=4$, and $Q_r=12$. To obtain a rotor with $Q_r=12$, conductor sets with $Q_r'=2$ or $Q_r'=4$ may be selected. Choosing $Q_r'=4$ results in $$N_{rcp} = \frac{Q_r}{Q'_r} = 3,$$

which is the number of the plurality of rotor connector plates 302, while choosing $Q_r'=2$ results in $N_{rcp}=6$. Selecting $Q_r'=4$ to reduce the number of the plurality of rotor connector plates 302, third rotor winding 700 includes a third common connection 702, the plurality of rotor slot conductors 300, a first rotor connector plate 704a, a second rotor connector plate 704b, and a third rotor connector plate 704c.

$Q_r=12$ was selected for simplicity of the drawing. According to best practices for induction motor design, for example, as described in the text book Pyrhonen, et al., *Design of rotating electrical machines*, John Wiley & Sons (2013), this number of rotor slots would likely yield poor motor performance. A preferred number of rotor slots for a machine with p=3, that are multiples of $Q_r'=4$, include $Q_r=16, 20, 28, 32, \ldots$ depending on the number of stator slots $Q_s$ of the machine design. For example, choosing $$N_{rcp} = \frac{Q_r}{Q'_r} = 4.$$

The plurality of rotor slot conductors 300 include a first rotor slot conductor 706-1, a second rotor slot conductor 706-2, a third rotor slot conductor 706-3, a fourth rotor slot conductor 706-4, a fifth rotor slot conductor 706-5, a sixth rotor slot conductor 706-6, a seventh rotor slot conductor 706-7, an eighth rotor slot conductor 706-8, a ninth rotor slot conductor 706-9, a tenth rotor slot conductor 706-10, an eleventh rotor slot conductor 706-11, and a twelfth rotor slot conductor 706-12. Third common connection 702 may be created by connecting a first end of the plurality of rotor slot conductors 300 to common connector plate 304 with 12 apertures.

First rotor slot conductor 706-1, fourth rotor slot conductor 706-4, seventh rotor slot conductor 706-7, and tenth rotor slot conductor 706-10 are each connected to first rotor connector plate 704a equally spaced circumferentially around first rotor connector plate 704a by $360/Q'_r$ or 90 degrees from each other. Second rotor slot conductor 706-2, fifth rotor slot conductor 706-5, eighth rotor slot conductor 706-8, and eleventh rotor slot conductor 706-11 are each connected to second rotor connector plate 704b equally spaced circumferentially around second rotor connector plate 704b by $360/Q'_r$ or 90 degrees from each other. Third rotor slot conductor 706-3, sixth rotor slot conductor 706-6, ninth rotor slot conductor 706-9, and twelfth rotor slot conductor 706-12 are each connected to third rotor connector plate 704c equally spaced circumferentially around third rotor connector plate 704c by $360/Q'_r$ or 90 degrees from each other. First rotor connector plate 704a, second rotor connector plate 704b, and third rotor connector plate 704c are stacked axially relative to the second end of rotor 222 to connect the three conductor sets of four slot conductors.

When mounted to shaft 108 and rotor 222, first rotor connector plate 704a, second rotor connector plate 704b, and third rotor connector plate 704c are rotated relative to each other by $360/Q_r$ or 30 degrees so that each rotor slot conductor of the plurality of rotor slot conductors 300 is separated by 30 degrees around rotor 222.

Figure 7B:
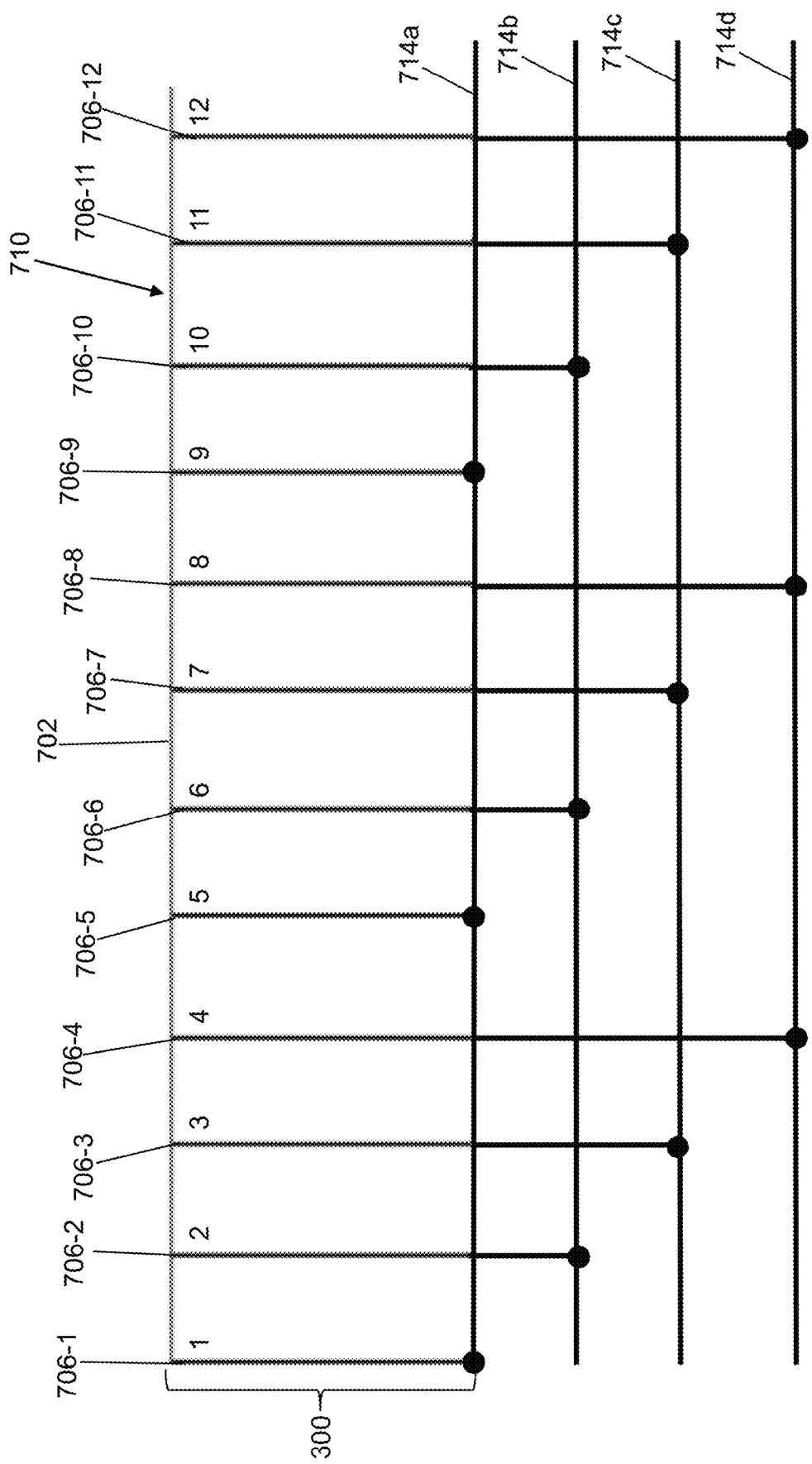
FIG. 7B depicts a fourth rotor winding in accordance with an illustrative embodiment.

For further illustration, referring to FIG. 7B, a fourth rotor winding 710 is shown in accordance with an illustrative embodiment. Fourth rotor winding 710 is applied to a motor with p=2, $p_s$=3, and $Q_r$=12. To obtain a rotor with $Q_r$=12, four cage conductor sets of $Q_r'$=3 is selected. Fourth rotor winding 710 includes third common connection 702, the plurality of rotor slot conductors 300, a first rotor connector plate 714a, a second rotor connector plate 714b, a third rotor connector plate 714c, and a fourth rotor connector plate 714d. The plurality of rotor slot conductors 300 include first rotor slot conductor 706-1, second rotor slot conductor 706-2, third rotor slot conductor 706-3, fourth rotor slot conductor 706-4, fifth rotor slot conductor 706-5, sixth rotor slot conductor 706-6, seventh rotor slot conductor 706-7, eighth rotor slot conductor 706-8, ninth rotor slot conductor 706-9, tenth rotor slot conductor 706-10, eleventh rotor slot conductor 706-11, and twelfth rotor slot conductor 706-12.

First rotor slot conductor 706-1, fifth rotor slot conductor 706-5, and ninth rotor slot conductor 706-9 are each connected to first rotor connector plate 714a equally spaced circumferentially around first rotor connector plate 714a by $360/Q'_r$ or 120 degrees from each other. Second rotor slot conductor 706-2, sixth rotor slot conductor 706-6, and tenth rotor slot conductor 706-10 are each connected to second rotor connector plate 714b equally spaced circumferentially around second rotor connector plate 714b by $360/Q'_r$ or 120 degrees from each other. Third rotor slot conductor 706-3, seventh rotor slot conductor 706-7, and eleventh rotor slot conductor 706-11 are each connected to third rotor connector plate 714c equally spaced circumferentially around third rotor connector plate 714c by $360/Q'_r$ or 120 degrees from each other. Fourth rotor slot conductor 706-4, eighth rotor slot conductor 706-8, and twelfth rotor slot conductor 706-12 are each connected to fourth rotor connector plate 714d equally spaced circumferentially around fourth rotor connector plate 714d by $360/Q'_r$ or 120 degrees from each other. First rotor connector plate 714a, second rotor connector plate 714b, third rotor connector plate 714c, and fourth rotor connector plate 714d are stacked axially relative to the second end of rotor 222 to connect the four conductor sets of three slot conductors.

When mounted to shaft 108 and rotor 222, first rotor connector plate 714a, second rotor connector plate 714b, third rotor connector plate 714c, and fourth rotor connector plate 714d are rotated relative to each other by $360/Q_r$ or 30 degrees so that each rotor slot conductor of the plurality of rotor slot conductors 300 is separated by 30 degrees around rotor 222.

Figure 8:
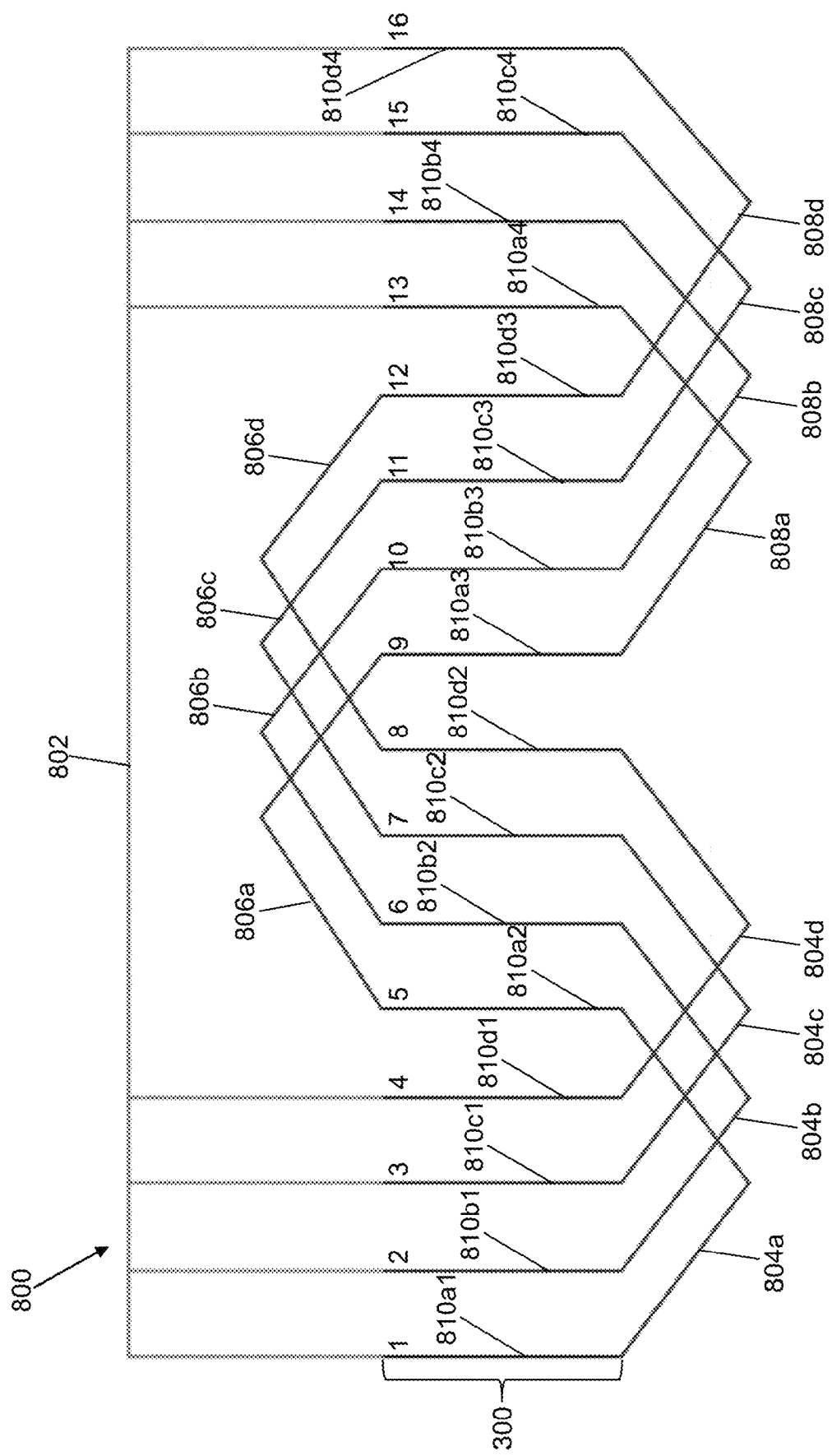
FIG. 8 depicts a fifth rotor winding in accordance with an illustrative embodiment.

Referring to FIG. 8, a fifth rotor winding 800 is shown in accordance with an illustrative embodiment. Fifth rotor winding 800 is a single layer winding with two coils in series per phase. The example machine has p=2, $p_s$=1, $Q_r$=16, and $N_p$=4. Fifth rotor winding 800 includes a fourth common connection 802, the plurality of rotor slot conductors 300, a first phase A connection pair 804a, a first phase B connection pair 804b, a first phase C connection pair 804c, a first phase D connection pair 804d, a second phase A connection pair 806a, a second phase B connection pair 806b, a second phase C connection pair 806c, a second phase D connection pair 806d, a third phase A connection pair 808a, a third phase B connection pair 808b, a third phase C connection pair 808c, and a third phase D connection pair 808d.

The plurality of rotor slot conductors 300 include a first phase A slot conductor 810a1, a first phase B slot conductor 810b1, a first phase C slot conductor 810c1, a first phase D slot conductor 810d1, a second phase A slot conductor 810a2, a second phase B slot conductor 810b2, a second phase C slot conductor 810c2, a second phase D slot conductor 810d2, a third phase A slot conductor 810a3, a third phase B slot conductor 810b3, a third phase C slot conductor 810c3, a third phase D slot conductor 810d3, a fourth phase A slot conductor 810a4, a fourth phase B slot conductor 810b4, a fourth phase C slot conductor 810c4, and a fourth phase D slot conductor 810d4.

A first end of first phase A slot conductor 810a1 is electrically connected to fourth common connection 802. First phase A connection pair 804a electrically connects a second end of first phase A slot conductor 810a1 with a second end of second phase A slot conductor 810a2. Second phase A connection pair 806a electrically connects a first end of second phase A slot conductor 810a2 with a first end of third phase A slot conductor 810a3. Third phase A connection pair 808a electrically connects a second end of third phase A slot conductor 810a3 with a second end of fourth phase A slot conductor 810a4. A first end of fourth phase A slot conductor 810a4 is electrically connected to fourth common connection 802. Each of phases B, C, and D is similarly connected.

For illustration, fourth common connection 802 may be created by connecting a first end of the plurality of rotor slot conductors 300 to common connector plate 304 with 8 apertures instead of 16. For illustration, first phase A connection pair 804a, first phase B connection pair 804b, first phase C connection pair 804c, and first phase D connection pair 804d may be created by connecting the second end of first phase A slot conductor 810a1, first phase B slot conductor 810b1, first phase C slot conductor 810c1, first phase D slot conductor 810d1, second phase A slot conductor 810a2, second phase B slot conductor 810b2, second phase C slot conductor 810c2, and second phase D slot conductor 810d2 of the plurality of rotor slot conductors 300 to a respective rotor connector plate of the plurality of rotor connector plates 302 as shown in FIG. 3 though there are four rotor connector plates stacked axially relative to the second end to make these connection pairs that may be referred to as a first plurality of slot conductors.

Third phase A connection pair 808a, third phase B connection pair 808b, third phase C connection pair 808c, and third phase D connection pair 808d may be created by connecting the second end of third phase A slot conductor 810a3, third phase B slot conductor 810b3, third phase C slot conductor 810c3, third phase D slot conductor 810d3, fourth phase A slot conductor 810a4, fourth phase B slot conductor 810b4, fourth phase C slot conductor 810c4, and fourth phase D slot conductor 810d4 of the plurality of rotor slot conductors 300 to a respective rotor connector plate of the plurality of rotor connector plates 302 as shown in FIG. 3 though there are four rotor connector plates stacked axially relative to the second end to make these connection pairs also that may be referred to as a second plurality of slot conductors.

Second phase A connection pair 806a, second phase B connection pair 806b, second phase C connection pair 806c, and second phase D connection pair 806d may be created by connecting the first end of second phase A slot conductor 810a2, second phase B slot conductor 810b2, second phase C slot conductor 810c2, second phase D slot conductor 810d2, third phase A slot conductor 810a3, third phase B slot conductor 810b3, third phase C slot conductor 810c3, and third phase D slot conductor 810d3 of the plurality of rotor slot conductors 300 to a respective rotor connector plate of the plurality of rotor connector plates 302 as shown in FIG. 3 though there are four rotor connector plates stacked axially relative to the first end of rotor 222 to make these connection pairs that may be referred to as a third plurality of slot conductors.

Though FIG. 8 shows the third plurality of rotor connector plates mounted between the first end of the rotor core and common connector plate 304, in an alternative embodiment, common connector plate 304 may be mounted between the first end of the rotor core and the third plurality of rotor connector plates with suitable isolation through common connector plate 304. The third plurality of rotor connector plates connect the pairs of slot conductors in series.

As used herein, the term "mount" includes join, unite, connect, couple, associate, insert, hang, hold, affix, attach, fasten, bind, paste, secure, hinge, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element) unless specified otherwise. Elements referenced as mounted to each other herein may further be integrally formed together, for example, using a molding or thermoforming process as understood by a person of skill in the art. As a result, elements described herein as being mounted to each other need not be discrete structural elements unless specified otherwise. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations introduced in the drawings and are not intended to be limiting in any manner unless otherwise indicated.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced. Elements referenced as connected to each other herein may further be integrally formed together. As a result, elements described herein as being connected to each other need not be discrete structural elements. The elements may be connected permanently, removably, or releasably.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A rotor of an induction machine of a bearingless electrical machine comprising:
    a rotor core configured to define a plurality of rotor slots; and
    a rotor winding comprising
        a common connector plate mounted adjacent a first end of the rotor core;
        a plurality of rotor connector plates mounted adjacent a second end of the rotor core, wherein the first end is opposite the second end; and
        a slot conductor mounted within each rotor slot of the plurality of rotor slots, wherein each slot conductor is electrically connected to the common connector plate and to one rotor connector plate of the plurality of rotor connector plates,
        wherein each rotor connector plate of the plurality of rotor connector plates is configured to connect a group of slot conductors that includes at least two slot conductors, wherein a number of slot conductors included in the group of slot conductors is defined based on a predefined number of suspension pole pairs selected to provide a radial suspension force.

2. The rotor of claim 1, wherein the rotor winding provides a plurality of phases.

3. The rotor of claim 1, wherein each rotor slot of the plurality of rotor slots extends parallel to a longitudinal axis defined axially through a center of the rotor core, wherein the rotor rotates about the longitudinal axis.

4. The rotor of claim 3, wherein the plurality of rotor slots are evenly distributed circumferentially around the rotor core adjacent an outer edge of the rotor core.

5. The rotor of claim 1, wherein the rotor core and the rotor winding are formed of an electrically conductive material.

6. The rotor of claim 1, wherein the plurality of rotor connector plates are distributed in an axial direction parallel to a longitudinal axis defined axially through a center of the rotor core, wherein the plurality of rotor connector plates do not touch each other or the rotor core.

7. The rotor of claim 1, wherein the slot conductor is a bar of electrically conductive material.

8. The rotor of claim 1, wherein the slot conductor is a coil of electrically conductive material.

9. The rotor of claim 1, wherein the common connector plate comprises a plate of electrically conductive material through which conductor apertures are formed, wherein each slot conductor is inserted in a single aperture of the conductor apertures.

10. The rotor of claim 1, wherein the predefined number of suspension pole pairs is defined using $p_s = p \pm 1$, where $p_s$ is the predefined number of suspension pole pairs, and p is a predefined number of torque pole pairs.

11. The rotor of claim 10, wherein the number of slot conductors included in the group of slot conductors is defined using $Q'_r = p_s/k$, where $Q'_r$ is the number of slot conductors included in the group of slot conductors, and k is any integer greater than or equal to one that results in $Q'_r \geq 2$ and $Q'_r \leq Q_r/2$, $Q_r$ is a number of the plurality of rotor slots, and $Q'_r$ has an integer value.

12. The rotor of claim 11, wherein each rotor connector plate comprises a plate of electrically conductive material through which apertures are formed, wherein a number of the apertures is equal to the number of slot conductors included in the group of slot conductors, wherein the apertures are evenly distributed circumferentially around each rotor connector plate.

13. The rotor of claim 12, wherein an aperture angle between the apertures formed in each rotor connector plate of the plurality of rotor connector plates is defined using $\alpha = 2\pi/Q'_r$, where $\alpha$ is the aperture angle.

14. The rotor of claim 12, wherein a number of the plurality of rotor connector plates is defined using $N_{rcp} = Q_r/Q'_r$, where $N_{rcp}$ is the number of the plurality of rotor connector plates.

15. The rotor of claim 12, wherein a plate rotation angle is defined using $\alpha = 2\pi/Q_r$, where $\alpha$ is the plate rotation angle, wherein the apertures of each rotor connector plate are rotated by the plate rotation angle relative to the apertures of an adjacent rotor connector plate when the group of slot conductors are mounted to the apertures of each rotor connector plate.

16. A rotor of an induction machine of a bearingless electrical machine comprising:

a rotor core configured to define a plurality of rotor slots; and
a rotor winding comprising
  a common connector plate mounted adjacent a first end of the rotor core;
  a first plurality of rotor connector plates mounted adjacent a second end of the rotor core, wherein the first end is opposite the second end;
  a second plurality of rotor connector plates mounted adjacent the second end of the rotor core;
  a third plurality of rotor connector plates mounted adjacent the first end of the rotor core;
  a first plurality of slot conductors mounted within first rotor slots of the plurality of rotor slots, wherein each slot conductor of the first plurality of slot conductors is electrically connected to the common connector plate and to one rotor connector plate of the first plurality of rotor connector plates;
  a second plurality of slot conductors mounted within second rotor slots of the plurality of rotor slots, wherein each slot conductor of the second plurality of slot conductors is electrically connected to the common connector plate and to one rotor connector plate of the second plurality of rotor connector plates; and
  a third plurality of slot conductors mounted within third rotor slots of the plurality of rotor slots, wherein each slot conductor of the third plurality of slot conductors is electrically connected to one rotor connector plate of the third plurality of rotor connector plates and to either the one rotor connector plate of the first plurality of rotor connector plates or the one rotor connector plate of the second plurality of rotor connector plates,
  wherein each rotor connector plate of the third plurality of rotor connector plates is configured to connect a pair of slot conductors of the third plurality of slot conductors.

17. The rotor of claim 16, wherein the third plurality of rotor connector plates is mounted between the first end of the rotor core and the common connector plate.

18. The rotor of claim 16, wherein the common connector plate is mounted between the first end of the rotor core and the third plurality of rotor connector plates.

19. The rotor of claim 16, wherein the third plurality of rotor connector plates connect the pair of slot conductors in series between a first slot conductor of the first plurality of slot conductors and a second slot conductor of the second plurality of slot conductors.

20. The rotor of claim 16, wherein each rotor slot of the plurality of rotor slots extends parallel to a longitudinal axis defined axially through a center of the rotor core, wherein the plurality of rotor slots are evenly distributed circumferentially around the rotor core adjacent an outer edge of the rotor core.

* * * * *